Patented Nov. 30, 1943

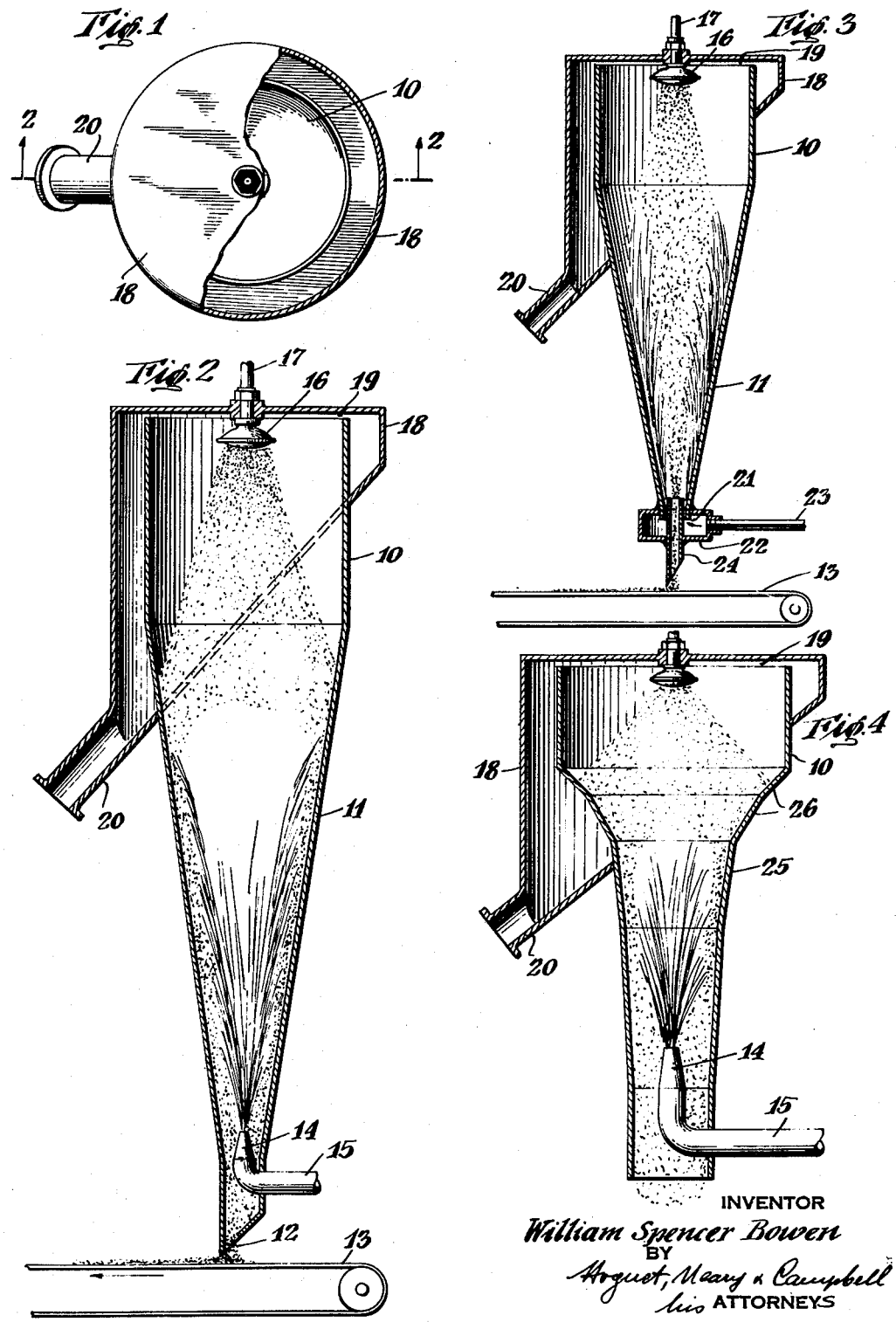

2,335,732

UNITED STATES PATENT OFFICE 2,335,732

DRYING AND CHILLING CHAMBER

William Spencer Bowen, Westfield, N. J.

Application December 21, 1939, Serial No. 310,312

4 Claims. (Cl. 34—168)

This invention relates to the spray processing of fluids and semi-fluid substances, and has particular reference to an improved method of desiccating or chilling liquids and plastic materials, and apparatus for accomplishing the same.

Desiccation of the solid constituents of fluids and the hardening of semi-fluid substances such as soaps, resinous plastics and the like, may be accomplished by spraying the material in finely divided form into a counter-flow of a gaseous desiccating or chilling medium. With a relatively unconfined flow of gaseous treating medium, proper control of the desiccating or hardening action to obtain a uniform product is difficult of achievement, due to variation in the particle size of the sprayed material with corresponding fluctuation in moisture content, and the tendency of the larger particles to prematurely discharge and the flow of treating medium due to their greater weight before proper modification of their physical properties is accomplished. Moreover, chilling or drying of the particles becomes increasingly difficult as the percentage of free moisture in the particles decreases.

Though the particles are subjected to substantially identical treatment by the gaseous treating medium, there is frequently undesirable retention of free moisture by the particles due in part to the formation of a relatively nonporous casing on the particle surface, which offers increasing resistance to withdrawal or freezing of the moisture content of the particles, as the process is carried to completion.

Accordingly, it is an object of the present invention to provide a method of treating substances in particle form wherein the physical properties of the treated particles are rendered substantially uniform, regardless of variations in particle size.

A further object is to provide a method of desiccating or chilling fluids which provides a maximum of desiccating or chilling action at that phase in the process wherein modification of the physical properties of the particles is most difficult.

A further object is to provide a method of spray-drying or chilling fluids wherein the sprayed material is subjected to increased chilling or desiccation as the temperature or moisture content, respectively, of the particles decreases.

A further object is to provide an improved method of desiccating or hardening fluids and semi-fluids in spray form by means of a gaseous medium whereby they are rendered uniform in their physical properties by preventing discharge of the fluid particles from the flow until their physical properties are altered to a desired degree.

A further object is to provide a method of spray-drying or chilling semi-fluids such as soaps and glues wherein deformation of the particle contour by objectionable contacts during treatment in the drying chamber is minimized.

Still a further object of the present invention is to provide an improved apparatus for carrying out the method of the present invention.

Further objects and advantages will be apparent from the following description of the invention and the drawing, wherein:

Figure 1 is a top view of apparatus constructed in accordance with the present invention with a portion in section to indicate the interior formation of the drying or chilling chamber;

Figure 2 is a view in vertical section taken along the line 2—2 of Figure 1 and in the direction of the arrows;

Figure 3 is a view similar to Figure 2, showing a further embodiment of the present invention, wherein the gaseous treating medium is introduced circumferentially of the drying chamber; and Figure 4 is a view in vertical section of a modified form of drying chamber constructed in accordance with the present invention.

Referring to Figures 1 and 2 of the drawing, the numeral 10 indicates the spray-processing chamber shown as a vertically positioned cylindrical tower having a bottom portion 11 converging downwardly to form a cone leading to a particle discharge outlet 12, which discharges the treated material onto a suitable conveyor 13. The treating medium, which for purposes of desiccation of the particles would be a heated gaseous medium such as air, is introduced into the spray-processing chamber through a jet or nozzle 14 positioned axially of the cone 11 and supplied with drying medium through a conduit 15. The material to be treated is introduced into the cylindrical chamber 10 by means of a suitable spray device 16 supplied with material through a conduit 17. The spray device 16 is supported axially of the chamber 10 by an outlet manifold 18 which encloses the open end of the chamber 10 to form an annular exhaust duct 19 about the periphery of the said chamber for the removal of spent, moisture saturated drying medium therefrom, the manifold discharging through a conduit 20.

The material to be treated is sprayed through the head 16 to form a diverging spray of material in the chamber 10, which falls by gravity into a rising counter-flow of drying medium from the nozzle 14.

The walls of the cone 11 flare outwardly from a point above the particle outlet 12 at an angle not exceeding 20° and preferably about 8°, the flare being gradual to permit an orderly, non-turbulent distribution of the drying medium across the diameter of the cone, preventing the formation of undesirable eddy currents or dead air spaces in the cone area. The nozzle 14 preferably is formed to discharge into the cone 11, a flow of drying medium having a relatively high axial velocity. The flow expands radially in its upward path to follow the contour of the cone, providing a flow of comparatively lower velocity about the inner circumference of the cone 11. The initial mean velocity of the drying medium upon discharge from the nozzle 14 preferably is controlled to provide a strong flow at the area of the nozzle 14 which gradually decreases in velocity as it rises and expands across the cone 11. For example, introduction of the drying medium into the cone 11 at an initial velocity of 6000 feet per minute will obtain a velocity of drying medium in the chamber 10 approximating 100 feet per minute, the latter figure, of course, being determined to some extent by the length and flare of the cone 11. Thus, the flow of drying medium provides a gentle preliminary desiccating action in the cylindrical chamber 10, permitting the relatively moist particles to fall uniformly through the drying medium with a minimum of turbulence.

The chamber 10 is formed cylindrically for such a length that the moist relatively plastic particles will cease to be tacky before discharge into the cone 11, thus eliminating undesirable adhesion and packing of the particles on the walls of the apparatus, particularly upon the converging walls of the cone 11. The length of the cylindrical chamber 10 will vary necessarily with the physical properties of the material under treatment. For example, desiccation of thin liquids requires a longer preliminary drying treatment to remove the adhesiveness of the material, than do semi-fluids such as syrups, or plastics. In such case, the length of the cylindrical chamber 10 should be extended considerably. With the chilling or freezing of materials, it has been found that some materials chill more readily than others, for instance, particles of soap chill more rapidly than glue. The desirable length of the chamber 10 will also vary with the size of the particles under treatment, smaller particles having relatively less surface area and weight and thus encountering less frictional resistance to their gravitational fall.

A preliminary hardening of the particles being accomplished in the chamber 10, the particles penetrate the counter-flow of drying medium in the cone 11, the velocity of the drying medium gradually increasing as the particles in their gravitational fall approach the particle outlet 12. It will be observed that the intensity of the drying action in the cone 11 increases as the moisture content of the falling particles approaches the minimum at which a complete transition of the particles to solid, dry form is most difficult of accomplishment.

As pointed out heretofore, upon introduction of the drying medium axially of the cone 11, the velocity of the drying medium will be greatest at the central area of the cone, the velocity thereof about the inner circumference being appreciably reduced due to the formation of the nozzle 14, and the contact friction with the walls of the cone 11. During the gravitational fall of the particles, at some point midway of the cone 11, the kinetic energy of the falling particles and the counter-flow of drying medium will balance, the point of balance varying considerably with the physical properties, weight, density and surface area of the material under treatment. Upon attainment of this point of balance, the particles will tend by gravity to seek that portion of the gaseous flow offering the minimum of resistance thereto, working to a point adjacent the walls of the cone 11 and then downwardly to the particle discharge outlet 12. As is shown in Figure 2, the desiccated or hardened particles collect in the outlet 12 above the conveyor 13, effectively sealing the bottom of the cone 11 to prevent drawing of air into the cone by the draft induced by the nozzle 14.

Because of their greater weight and surface area, the larger particles will receive a more extended treatment than the smaller particles, the kinetic energy of the larger particles being relatively greater to thereby extend the degree of penetration into the cone 11 before the kinetic energy of the particles and drying medium balance. As the larger particles more tenaciously occlude their moisture content, this extended phase of treatment for the larger particles lends to greater uniformity of product, minimizing the effects of variation in particle size. Further, as the flow of drying medium diverges across the entire transverse area of the cone 11 to completely eliminate the presence of dead air zones therein, the fortuitous premature discharge of particles from the drying zone is eliminated.

In Figure 3 of the drawings, there is shown a modification of the invention wherein the drying medium is introduced into the cone 11 through an annular orifice 21 opening into the cone from an inlet manifold 22, supplied with drying medium through a conduit 23. The manifold 22 is positioned annularly of a particle discharge outlet 24 positioned axially of and extending within the cone 11 to direct the flow of drying medium from the manifold 22 about the inner circumference of the cone 11. In this instance, the lowest velocity of the counter-flow is found in the area extending axially through the cone 11, and the particles under treatment will work ultimately to the axial discharge outlet 24, in the manner heretofore described.

In Figure 4, the apparatus of the invention is shown in a form modified to provide a chamber 25 having a number of frusto-conical wall segments 26 which are flared in increasing degrees of angularity from the axis of the conical chamber. This embodiment of the invention is particularly adapted for use when a prolonged preliminary drying treatment of the falling particles in the cylindrical chamber 10 is necessitated by the physical properties of the material under treatment. The angular structure of the walls of the chamber 25 may be varied within a wide range to provide a more accurately controlled velocity characteristic of the drying medium counter-flow, affording a series of clearly defined phases of mean velocity of the drying medium in the chamber 25. The drying medium may be introduced axially of the chamber 25 by the nozzle 14, or annularly of the chamber 25 in the manner shown in Figure 3.

While the invention has been described as applied to the spray-drying of fluids and desiccation of semi-fluid materials, the apparatus and method of the invention are adapted readily to the chilling or freezing of such materials as soaps, soap powders, glue, syrup, resinous plastics and the like. Where the process is one of desiccation, it is essential only that the drying medium be capable of moisture absorption, the invention not being limited to the use of preheated gaseous drying mediums. With the chilling or freezing of materials, it is desirable in many instances that the moisture content of the sprayed particles be fixed therein with minimum loss of moisture by evaporation. Accordingly, the freezing medium should be saturated with moisture prior to refrigeration of the particles.

Due to elimination of the formation of uncontrolled eddy currents in the flow of treating medium through cone 11 and chamber 10, undesirable deformation of the falling particles by direct contact with the walls of the apparatus is avoided. The cushioning effect of the treating medium in the cone 11 retards the fall of the particles to the discharge outlet, eliminating the damage to particle form experienced with the drop forming shot tower types of drying or chilling apparatus presently in use.

The method of treating materials by spraying particles of the materials into a counterflow of treating medium which constantly increases in velocity as the gravitational fall of the particles proceeds, brings the particles into the zone of maximum treatment at the time when complete modification of the physical properties of the particles is the most difficult of accomplishment. The method of the invention further reduces the tendency of the particles to case harden under treatment, thereby improving the solubility characteristic of the product.

Due to the selective discharge of the modified particles from the zone of treatment in accordance with their weight, the product processed by the method of this invention exhibits uniformity of physical properties in a degree hitherto unattainable.

While the invention has been described with reference to a specific process and apparatus, the references thereto are made only by way of illustration and the invention is to be limited only as defined in the following claims.

I claim:

1. An apparatus for processing fluid and semi-fluid materials comprising a housing shaped to form at least in part a downwardly tapering cone-like member, means for introducing the material to be treated in particle form into the upper portion of said housing, said housing having a bottom discharge outlet for the particles, gas inlet means adjacent to said discharge outlet, extending substantially axially of and within said housing and of lesser cross-sectional area than the adjacent portion of said housing, providing a passageway between said gas inlet means and said portion of said housing connecting said housing and said discharge outlet, and means for introducing a gaseous medium at high velocity through said gas inlet means into said housing to subject the particles of material to increasing resistance as they progress downwardly in their gravitational fall toward said discharge outlet.

2. An apparatus for processing fluid and semi-fluid materials comprising a housing shaped to provide an upper cylindrical chamber and a lower downwardly tapering cone-like chamber, the apex portion of said lower chamber having a discharge outlet, means for introducing the material to be treated in particle form into the upper chamber for gravitation downwardly into the cone shaped chamber toward said discharge outlet, gas inlet means adjacent to said discharge outlet, disposed substantially centrally of and of lesser cross-sectional area than the adjacent portion of said lower chamber to provide a passage between said gas inlet and said adjacent portion connecting said lower chamber and said discharge outlet, and means for delivering a column of a gaseous medium under pressure upwardly through said gas inlet means into the conical and cylindrical chambers counter to the gravitational movement of the particles to subject the material to increasing resistance as they progress downwardly in their gravitational fall toward said discharge outlet.

3. An apparatus for processing fluid and semi-fluid materials comprising a housing shaped to form at least in part an elongated downwardly tapering cone-like chamber, means for introducing the material to be treated in particle form into the upper portion of said chamber, said housing having a bottom discharge outlet for the particles, an imperforate hood having a discharge outlet adjacent to its lower end covering the upper end of said housing in spaced relation to provide an annular exhaust outlet, a gas inlet nozzle in the lower portion of said chamber adjacent to said discharge outlet, said nozzle being of lesser cross-sectional area than said lower portion and disposed centrally thereof to provide a passage around said nozzle connecting said lower chamber and said discharge outlet, and means for delivering a column of a gaseous medium under pressure through said nozzle upwardly into said chamber counter to the gravitational movement of the particles to subject the particles of material to increasing resistance as they progress downwardly in their gravitational fall toward said discharge outlet.

4. An apparatus for processing fluid and semi-fluid material comprising a housing shaped to form at least in part an elongated downwardly tapering cone-like chamber having walls formed of a plurality of frusto-conical segments with each lower successive segment being of smaller average diameter than the next upper adjacent segment, means for introducing the material to be treated in particle form into the upper portion of said chamber, said housing having a bottom discharge outlet for the particles, a nozzle adjacent said discharge outlet and spaced from the walls of said chamber to provide a substantially annular passage through which processed material can escape to said discharge outlet and means for delivering a gas at high velocity through said nozzle to subject the particles of material to increasing resistance as they progress downwardly in their gravitational fall toward said discharge outlet, said column of gaseous medium being restricted in area adjacent to said nozzle to permit processed material to escape downwardly through said passage.

WILLIAM SPENCER BOWEN.

CERTIFICATE OF CORRECTION.

Patent No. 2,335,732. November 30, 1943.

WILLIAM SPENCER BOWEN.

It is hereby certified that error appears in the printed specification of the above numbered patent requiring correction as follows: Page 1, first column, line 18, for "and" after "discharge" read --from--; and that the said Letters Patent should be read with this correction therein that the same may conform to the record of the case in the Patent Office.

Signed and sealed this 18th day of January, A. D. 1944.

(Seal)

Henry Van Arsdale,
Acting Commissioner of Patents.